(12) United States Patent
Muramoto

(10) Patent No.: US 6,609,994 B2
(45) Date of Patent: Aug. 26, 2003

(54) BRAKING/DRIVING CONTROL APPARATUS AND METHOD FOR AUTOMOTIVE VEHICLE

(75) Inventor: Itsuro Muramoto, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/075,607

(22) Filed: Feb. 15, 2002

(65) Prior Publication Data
US 2002/0132702 A1 Sep. 19, 2002

(30) Foreign Application Priority Data
Mar. 16, 2001 (JP) ......................... 2001-076248

(51) Int. Cl.[7] .............................................. B60K 41/12
(52) U.S. Cl. ........................... 477/40; 477/42; 477/92; 701/93
(58) Field of Search .......................... 477/40, 92, 95, 477/42, 108; 701/93

(56) References Cited

U.S. PATENT DOCUMENTS 4,829,433 A * 5/1989 Nakano et al. ............... 477/40
4,961,146 A * 10/1990 Kajiwara ...................... 701/93
5,060,768 A * 10/1991 Yamashita et al. ............ 477/40
5,931,252 A   8/1999 Shimizu et al. ............. 180/204

FOREIGN PATENT DOCUMENTS

JP   10-278825   10/1998
JP   2001-71794   3/2001

* cited by examiner

Primary Examiner—Dirk Wright
(74) Attorney, Agent, or Firm—Foley & Lardner

(57) ABSTRACT

In braking/driving force controlling apparatus and method for an automotive vehicle, a state discriminating section discriminates between a parking state in which a manipulation for the vehicle to be parked is carried out and a non-parking state in which no manipulation for the vehicle to be parked is carried out, a controller detects a manipulated variable of a manual input section, generates a constant target vehicle speed corresponding to the detected manipulated variable in a case where the state discriminating section discriminates the parking state, calculates a vehicular braking/driving force for a present vehicle speed to become the target vehicle speed, and controls the vehicular braking/driving force on the basis of the calculated braking/driving force.

20 Claims, 4 Drawing Sheets

BRAKING/DRIVING CONTROL APPARATUS AND METHOD FOR AUTOMOTIVE VEHICLE

BACKGROUND OF THE INVENTION

1. Field of the Invention

The present invention relates to braking/driving force controlling apparatus and method for an automotive vehicle and, more specifically, relates to the braking/driving force controlling apparatus and method suitable for the automotive vehicle to be parked.

2. Description of the Related Art

A Japanese Patent Application First Publication No. Heisei 10-278825 published on Oct. 28, 1998 which corresponds to a U.S. Pat. No. 5,931,252 issued on Aug. 3, 1999 exemplifies a previously proposed automatic steering system for an automotive vehicle in which the vehicle moves in accordance with a locus predefined at a time of an automatic steering during a vehicular parking. In a case where a vehicle creep speed falls out of a predetermined speed range, the automatic steering system urges a vehicle driver to carry out a brake manipulation or accelerator manipulation through a liquid crystal display or speaker.

SUMMARY OF THE INVENTION

In the previously proposed automatic steering system disclosed in the above-identified Japanese Patent Application First Publication, the driver is informed to carry out the brake manipulation or accelerator manipulation.

Hence, for example, in a case where the vehicle is needed to be parked while ascending a slope, a suitable vehicle creep speed is often not obtained merely by the brake manipulation. In this case, the driver needs to depress an accelerator pedal to once raise the vehicle speed up to a predetermined vehicle speed and, thereafter, needs to depress a brake pedal in accordance with an operation command from the previously proposed automatic steering system. In this way, the driver needs to change the pedal to be depressed to drive the vehicle. The driving operation is troublesome for the driver.

It is, hence, an object of the present invention to provide improved braking/driving force control apparatus and method for an automotive vehicle which can achieve an easy driving operation even if the vehicle parking is carried out at any place.

According to one aspect of the present invention, there is provided a braking/driving force controlling apparatus for an automotive vehicle, comprising: a state discriminating section that discriminates between a parking state in which a manipulation for the vehicle to be parked is carried out and a non-parking state in which no manipulation for the vehicle to be parked is carried out; a manual input section that is enabled to be manipulated; a manipulated variable detecting section that detects a manipulated variable of the manual input section; a target vehicle speed generating section that generates a constant target vehicle speed corresponding to the manipulated variable detected by the manipulated variable detecting section in a case where the state discriminating section discriminates the parking state; a braking/driving force calculating section that calculates a vehicular braking/driving force for a present vehicle speed to become the target vehicle speed; and a braking/driving force controlling section that controls the vehicular braking/driving force on the basis of the vehicular braking/driving force calculated by the braking/driving force calculating section.

According to another aspect of the present invention, there is provided a braking/driving force controlling apparatus for an automotive vehicle, comprising: a state discriminating section that discriminates between a parking state in which a manipulation for the vehicle to be parked is carried out and a non-parking state in which no manipulation for the vehicle to be parked is carried out; a manual input section that is enabled to be manipulated; a manipulated variable detecting section that detects a manipulated variable of the manual input section; a target vehicle speed generating section that generates a target vehicle speed based on the manipulated variable detected by the manipulated variable detecting section; a braking/driving force calculating section that calculates a vehicular braking/driving force for a present vehicle speed to become the target vehicle speed generated by the target vehicle speed generating section; and a braking/driving force controlling section that controls a vehicular braking/driving force on the basis of the vehicular braking/driving force calculated by the braking/driving force calculating section, and wherein the target vehicle speed generating section generates a constant target vehicle speed when the manipulated variable detected by the manipulated variable detecting section is zero and the braking/driving force calculating section calculates a new target braking/driving force by combining the vehicular braking/driving force for the vehicle speed to become the constant target vehicle speed with the vehicular braking/driving force based on the manipulated variable detected by the manipulation detecting section.

According to a still another aspect of the present invention, there is provided a braking/driving force controlling method for an automotive vehicle, comprising: discriminating between a parking state in which a manipulation for the vehicle to be parked is carried out and a non-parking state in which no manipulation for the vehicle to be parked is carried out; detecting a manipulated variable of a manual input section that is enabled to be manipulated; generating a constant target vehicle speed corresponding to the detected manipulated variable in a case where the parking state is discriminated; calculating a vehicular braking/driving force for a present vehicle speed to become the target vehicle speed; and controlling the vehicular braking/driving force on the basis of the calculated vehicular braking/driving force.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
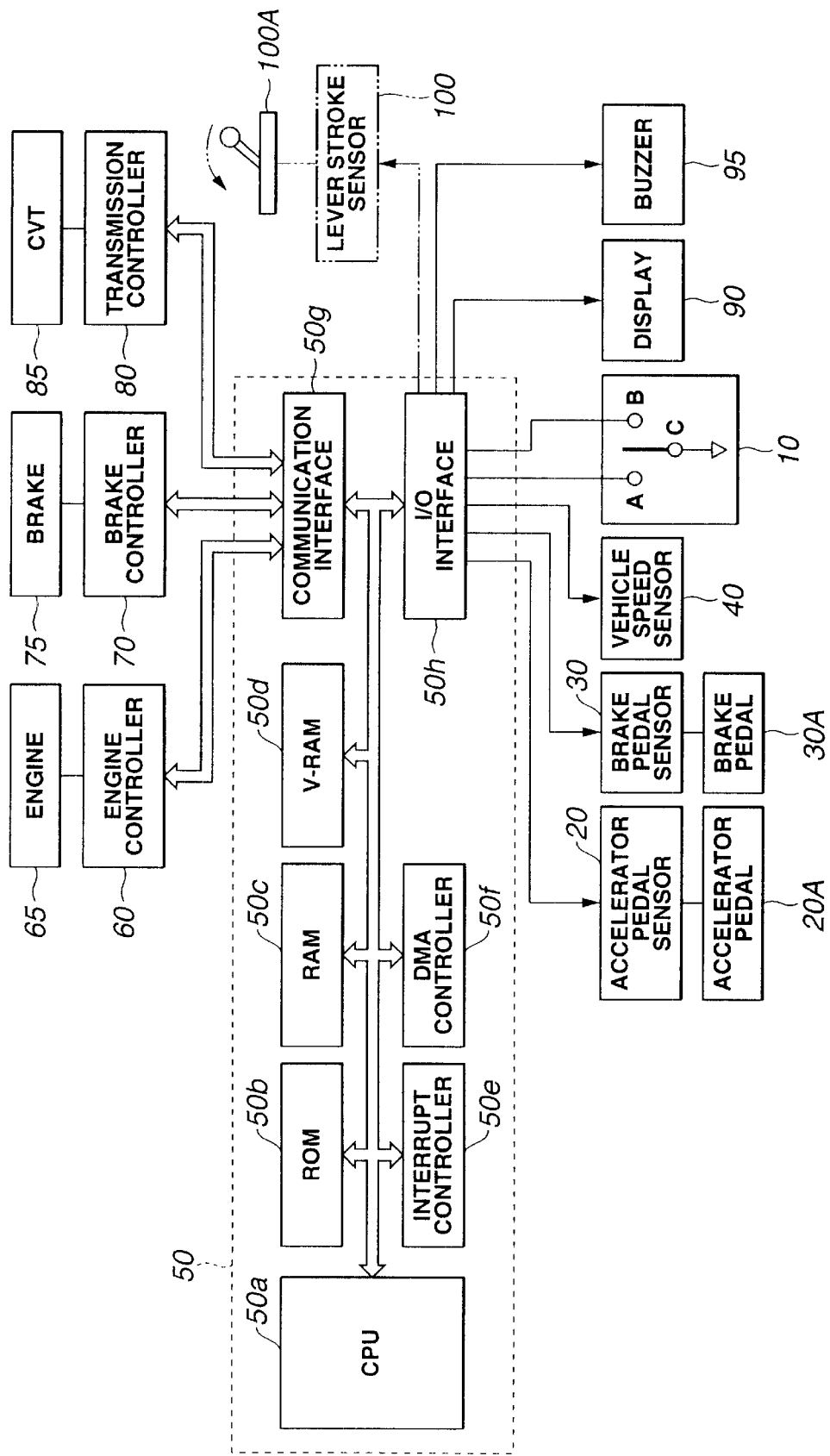
FIG. 1 is a schematic circuit block diagram of a braking/driving force control apparatus in a first preferred embodiment according to the present invention.

FIG. 1 shows a schematic circuit block diagram of a braking/driving force control apparatus in a first preferred embodiment according to the present invention.

In FIG. 1, a mode selection switch 10 is installed on an instrument panel of a passenger compartment of a vehicle (not shown) to be manipulated by a vehicle driver. If a terminal A is contacted with a termina 1C, a signal indicating a parking mode is outputted to a controller 50. In addition, if a terminal B is contacted with terminal C (grounded), a signal indicating a non-parking mode is outputted to controller 50.

A brake pedal sensor 30 is disposed on a brake pedal 30A to detect a manipulated variable of the brake pedal 30A. It is noted that, in the whole specification, the manipulated variable detected by brake pedal sensor 30 is described in such a way that the manipulated variable is 0[%] in a case where brake pedal 30A is not depressed (not manipulated), namely, when non-operation of brake pedal 30A is carried out and in such a way that the manipulated variable corresponding to a full brake is 100[%]. An accelerator pedal sensor 20 is disposed on an accelerator pedal 20A to detect a manipulated variable of accelerator pedal 20A. A vehicle speed sensor 40 includes an encoder for detecting a wheel speed of a non-driven wheel of the vehicle.

Controller 50 includes, for example, a microcomputer having a CPU (Central Processing Unit) 50a; a ROM (Read Only Memory) 50b; a RAM (Random Access Memory) 50c; a V-RAM (Video-Random Access Memory) 50d; an interrupt controller 50e; a DMA (Direct Memory Access) controller 50f; and Communication Interface 50g; an I/O interface 50h; and a common bus.

An engine controller 60 generally controls an intake-air quantity and so forth of an engine 65 in accordance with predefined arithmetic and logic operations while inputting various sensor signals from accelerator pedal sensor 20, a coolant temperature sensor (not shown), and so forth.

A brake controller 70 controls a brake liquid pressure of a brake 75 in accordance with predefined arithmetic and logic operations while inputting various signals from brake pedal sensor 30, vehicle speed sensor 40, and longitudinal and lateral acceleration sensors (not shown).

A transmission controller 80 controls a continuously variable transmission (so-called, CVT) 70 in accordance with predefined arithmetic and logic operations while inputting throttle opening angle (engine load) and so forth.

A display 90 is connected to controller 50 and is disposed within the passenger compartment to display, for example, a navigation image screen, a vehicular air conditioner image screen, and other vehicular information and display an information to an effect that the driver operates mode selection switch (SW) 10 to the parking mode or that accelerator pedal 20A depressed in spite of mode selection switch 10 positioned into the parking mode. Furthermore, a buzzer 95 is installed within the passenger compartment to inform the driver that accelerator pedal 20A is operated in spite of the fact that mode selection switch 10 is placed in the parking mode as described above.

Figure 2:
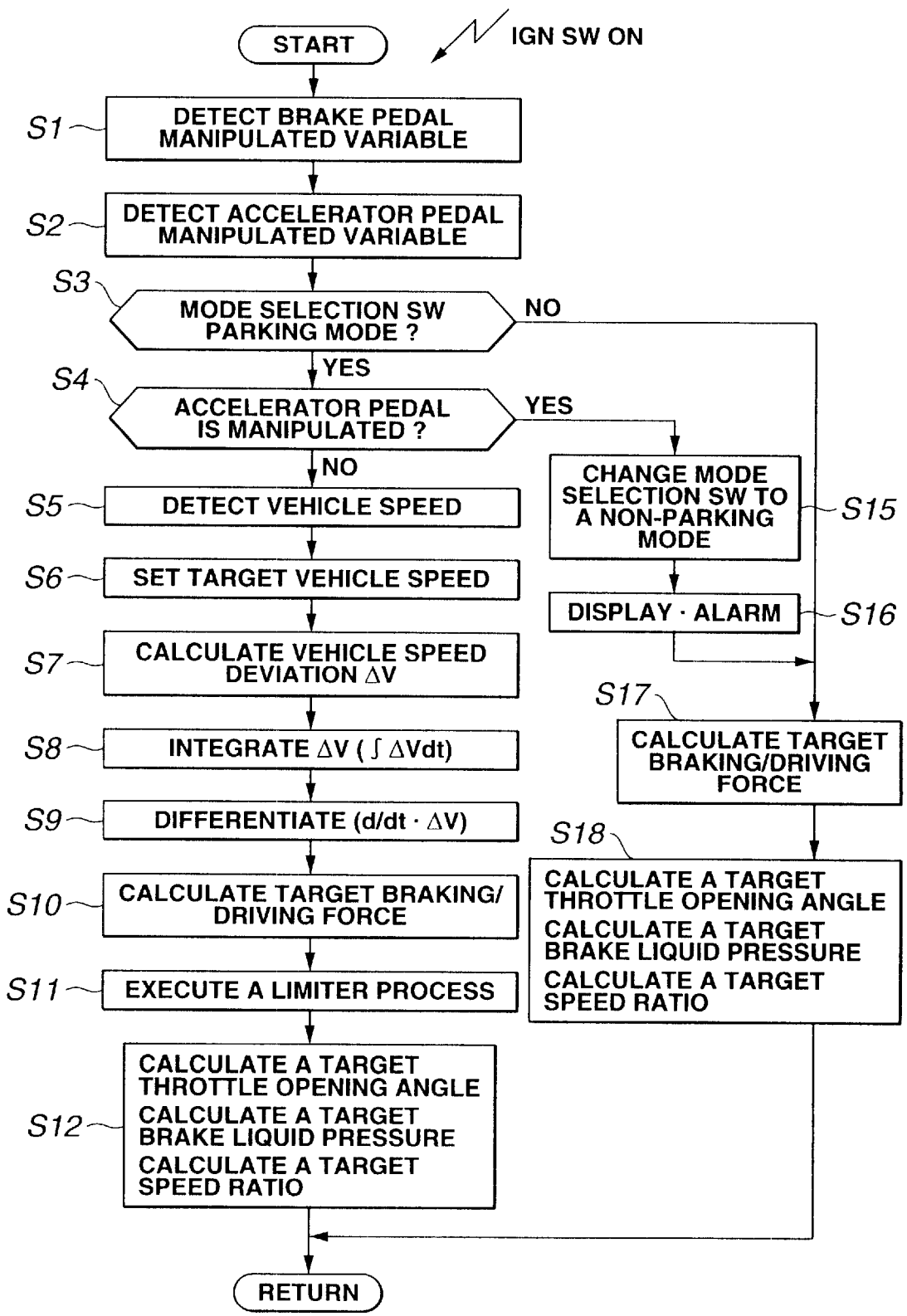
FIG. 2 is an operational flowchart executed by a controller of the first embodiment shown in FIG. 1.

Next, FIG. 2 shows an operational flowchart for explaining a control program stored in ROM 50b within controller 50.

The control program based on FIG. 2 is started when an ignition switch of the vehicle is turned on (IGN SW ON).

At a step S1, controller 50 detects the manipulated variable of brake pedal 30A from brake pedal sensor 30.

At the next step S2, controller 50 detects the manipulated variable of accelerator pedal 20A from accelerator pedal sensor 20.

At the next step S3, controller 50 determines to which mode mode selection switch 10 is selected, i.e., whether mode selection switch 10 is selected to the parking mode.

If mode selection switch 10 is selected to the parking mode (Yes) at step S3, the routine goes to a step S4. If not selected to the parking mode (No) at step S3, the routine goes to a step S17.

At step S4, controller 50 determines if accelerator pedal 20A is manipulated. This step S4 serves to determine whether accelerator pedal 20A has been manipulated in spite of the fact that mode selection switch 10 is selected to the non-parking mode. If accelerator pedal 20a has been manipulated (Yes) at step S4, controller 50 determines that the parking mode is cancelled according to an intention of the driver and the routine goes to a step S15. If No at step S4, the routine goes to a step S5.

At step S15, controller 50 forcefully moves mode selection switch 10 to the non-parking mode. Thereafter, the routine goes to a step S16. At step S16, controller 50 commands display 90 to display that the driving mode is switched to the non-parking mode and issues an alarm through buzzer 95.

Next, if controller 50 does not determine that accelerator pedal 20A is manipulated (No) at step S4, controller 50 determines that the parking mode is continued and detects a present vehicle speed at step S5.

Figure 3:
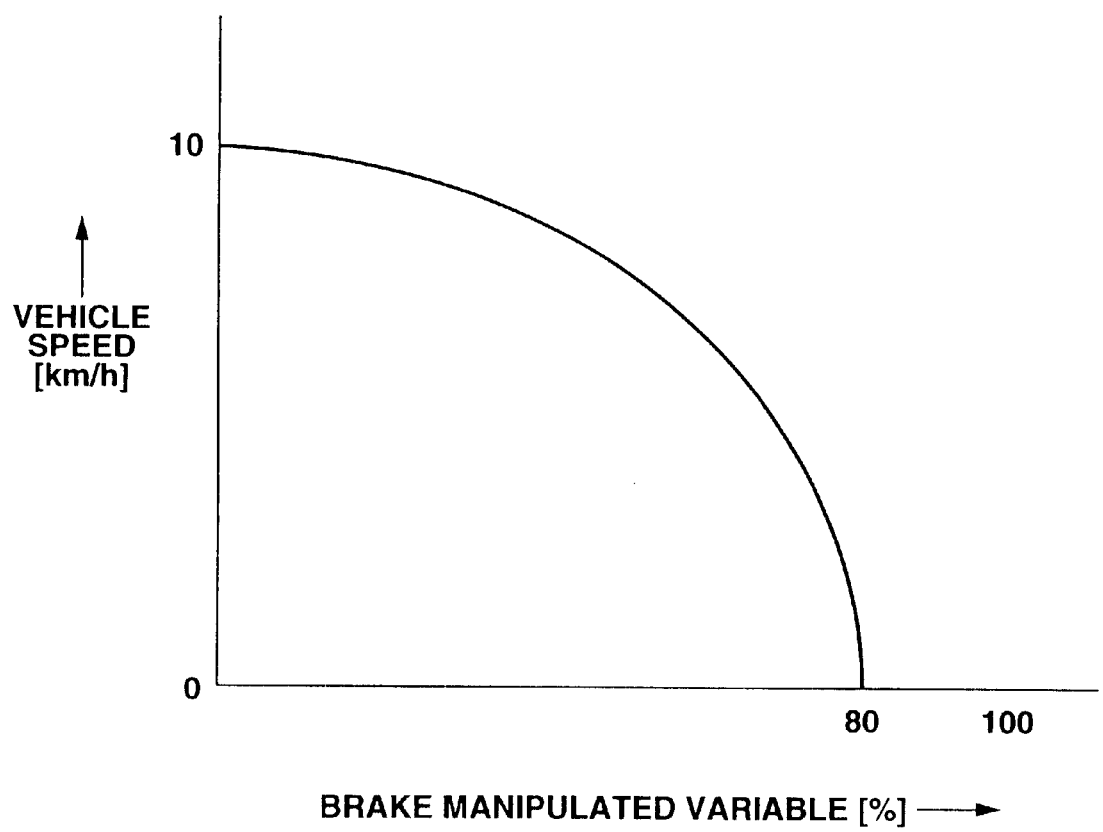
FIG. 3 is a characteristic graph representing a relationship between a brake manipulated variable and vehicle speed.

At the next step S6, controller 50 reads (calculates) a target vehicle speed from a map shown in FIG. 3 and stored in ROM 50b on the basis of the manipulated variable of brake pedal 30A. As shown in the map in FIG. 3, if the manipulated variable of brake pedal 30A is 0[%], the target vehicle speed is a predetermined vehicle speed (for example, 10 Km/h). As the manipulated variable of brake pedal 30A becomes large, the target vehicle speed becomes small. At a time point at which the manipulated variable of brake pedal 30A is larger than a certain value (for example, 80[%]), the target vehicle speed indicates 0 Km/h. The map in FIG. 3 is set in such a way that when the manipulated variable of brake pedal 30A is 0[%], i.e., during the non-manipulation of brake pedal 30A, the target vehicle speed is the vehicle speed equal to or larger than the vehicle creep speed at an ordinary run of the vehicle on a flat road.

Next, at a step S7, controller 50 calculates a vehicle speed deviation $\Delta V$ between the target vehicle speed calculated at step S6 and an actual (present) vehicle speed detected at step S5. At a step S8, controller 50 integrates vehicle speed deviation $\Delta V$ calculated at step S7 ($\int \Delta V$).

At the next step S8, controller 50 calculates a differentiation of vehicle speed deviation $\Delta V((d/dt) \cdot \Delta V)$ calculated at step S7.

At the next step S10, controller 50 calculates a target braking/driving force on the basis of the following equation. Target braking/driving force $Te = K_p \cdot \Delta V + K_I \int \Delta V + K_D((d/dt) \cdot \Delta V)$, $K_p$ denotes a predetermined proportional gain, $K_I$ denotes a predetermined integration gain, and $K_p$ denotes a predetermined differentiation gain.

Suppose that the manipulated variable of the brake pedal is 0[%], the target vehicle speed is 10 Km/h, and the present detected vehicle speed is, for example, 7 Km/h. In this case, it is sufficient to obtain the braking/driving force to achieve the deviation of the vehicle speed (namely, 10−7=3 Km/h). These steps S7 through S9 calculate such a target braking/driving force as described above.

At the next step S11, controller 50 compares target braking/driving force Te calculated at step S10 with a predetermined braking/driving force T. If Te>T at step S11, controller 50 sets target braking/driving force Te to a predetermined value of T (Te=T). This means that a limiter is applied to target braking/driving force Te, namely, an upper limit value is provided in target braking/driving force Te. The reason for the provision on the limiter is as follows: for example, in a situation in which the vehicle is contacted against a difference in a road level to be stopped, it is not necessary for the vehicle to be moved more than the difference in the road level even if the parking is appropriately carried out. If the limiter is not provided, the vehicle tries to run at a certain vehicle speed on the basis of the brake manipulation of the vehicle driver in this situation. To prevent such an unnecessary vehicular movement as described above, the upper limit value is provided on the target braking/driving force. It is noted that although, as described above, the upper limit value is provided on the braking/driving force, the upper limit value is provided for the driving force but may not be provided for the braking force. However, to simplify the calculation, the upper limit value is, in this embodiment, present in a combination of the driving force with the braking force.

Next, at a step S12, controller 50 calculates a target throttle opening angle to achieve a target braking/driving force for which a limier process is executed at step S11. The calculated target throttle opening angle is outputted to engine controller 60. At step S12, controller 50 a target liquid pressure of the brake to achieve the target braking/driving force for which the limiter is provided and calculates a target transmission gear ratio (in a case of CVT 85, the target transmission gear ratio is called a target speed ratio) to achieve target braking/driving force for which the limiter is processed. The calculated target speed ratio is outputted to transmission controller 80. Then, the routine returns to step S1 (engine controller 60, brake controller 70, and transmission controller 80 control braking force and driving force to achieve target throttle opening angle, target brake liquid pressure, and target speed ratio inputted thereinto, respectively).

As described above, in the first embodiment according to the present invention, controller 50 calculates target braking/driving force for the vehicle to provide the constant vehicle speed in accordance with the manipulated variable in a case where mode selection switch 10 is selected to the parking mode. The engine, brake, and transmission (CVT) are controlled to achieve the target braking/driving force. Since the manipulation can be made with only brake pedal 30A, it is not necessary to change the pedal to be depressed even if any situation of the parking occurs. Consequently, the driving operation is not troublesome but may become easy.

In addition, since the constant vehicle speed corresponding to the manipulated variable of brake pedal 30A is obtained, the vehicle speed can be adjusted by operating brake pedal 30A the vehicle driver is ordinarily accustomed to use. A burden imposed on a parking operation of the driver can be relieved. Since a relatively high vehicle speed can be obtained when brake pedal 30A is not manipulated, the vehicle speed is set to a speed (about 5 Km/h to 10 Km/h) such as not to give an unpleasant feeling to the driver during the parking operation. It is, hence, not necessary to manipulate brake pedal 30A immediately before the vehicle stops. Consequently, the number of times the driver operates brake pedal 30A can be reduced.

Since a maximum value of the target vehicle speed is a vehicle speed equal to or higher than the ordinary vehicle creep speed that the vehicle can obtain during the run on the flat road, an adjustment of the vehicle speed can be made by depressing brake pedal 30A on which a tiptoe of the driver is rested. In a case where the accelerator pedal is manipulated so that a higher vehicle speed than the expected is resulted, it is not necessary to change the pedal to be depressed and a quick adjustment of the vehicle speed can be made.

First Modification of First Embodiment

Next, a first modification of the first embodiment will be described below.

In the first embodiment, the constant vehicle speed corresponding to the brake pedal manipulated variable if the parking mode is selected. In the first modification, the constant vehicle speed corresponding to the manipulated variable of accelerator pedal 20A is derived. That is to say, during the parking mode, a certain constant vehicle speed (for example, 10 Km/h) is resulted if the manipulated variable of accelerator pedal 20A is equal to or larger than a predetermined variable. As the manipulated variable becomes small, the vehicle speed becomes lower. When accelerator pedal 20A is in the non-operation state (during a full closure of the throttle valve, a stroke variable is zero), controller 50 sets the vehicle speed to zero. In the first modification, the same advantages as those described in the first embodiment can be achieved.

Second Modification of First Embodiment

A second modification of the first embodiment will be described below.

If the parking mode is selected, the vehicle speed is controlled through a dedicated lever 100A in the second modification although the vehicle speed is controlled on the basis of the brake pedal manipulated variable in the first embodiment and is controlled on the basis of the accelerator pedal manipulated variable in the first modification. In the same way as described in the first embodiment, the constant vehicle speed is resulted during a non-operation of lever 10A. In addition, the vehicle speed may be lowered as an operation stroke of lever 100A detected by a lever stroke sensor 100 is increased. When a maximum operation of lever 100A is resulted, the vehicle speed becomes lowered in accordance with a quantity returned from the maximum operation state to the non-operation state. In a case where lever 100A is not manipulated, the vehicle speed may be set to 0 Km/h.

According to the second modification, the same advantages as the first embodiment can be achieved. Since dedicated lever 100A is operated, the driver can recognize that the vehicle enters the parking mode which is different from the ordinary run and operates lever 100A upon the recognition of the parking mode by the driver. Consequently, no unpleasant feeling which does not meet with the driving sense can be relieved. In a case wherein the brake pedal and accelerator pedal manipulations are detected during the operation of lever 10A, the forceful set from the parking mode to the non-parking mode is made so that the driver makes a quick response to a step of parking motion.

In the above-described second modification, dedicated lever 100A has been used to control the vehicle speed. However, the same advantages as those described in the second modification can be achieved by a use of a joystick or other switches.

Second Embodiment

Next, a second embodiment of the braking/driving force control apparatus according to the present invention will be described below.

An operation of the braking/driving control apparatus according to the present invention will be described below.

At a step S51, controller 50 detects whether mode selection switch 10 is set at the parking mode. In the case of the parking mode (Yes), the routine goes to a step S52. If controller 50 determines that mode selection switch 10 is set to the non-parking mode (No), the routine goes to a step S82. If controller 50 determines that mode selection switch 10 is in the parking mode, the routine goes to a step S52. At step S52, controller 50 detects the manipulated variable of the accelerator pedal from accelerator pedal sensor 20. At a step S53, controller 50 determines if accelerator pedal 20A is manipulated. If accelerator pedal 20A is manipulated (Yes) at a step S53, the routine goes to a step S80. If accelerator pedal 20A is not manipulated (No) at step S53, the routine goes to a step S64.

At step S54, controller 50 detects the manipulated variable of brake pedal 30A and the routine goes to a step S55. At step S55, controller 50 determines whether brake pedal 30A is manipulated from the manipulated variable of brake pedal 30A detected at step S54. If brake pedal 30A is manipulated (Yes) at step S55, the routine goes to a step S70. If brake pedal 30A is not manipulated (No) at step S55, the routine goes to a step S56. If controller 50 detects the present vehicle speed on the basis of an output signal from vehicle speed sensor 40. At a step S57, controller 50 determines the target vehicle speed.

Figure 4:
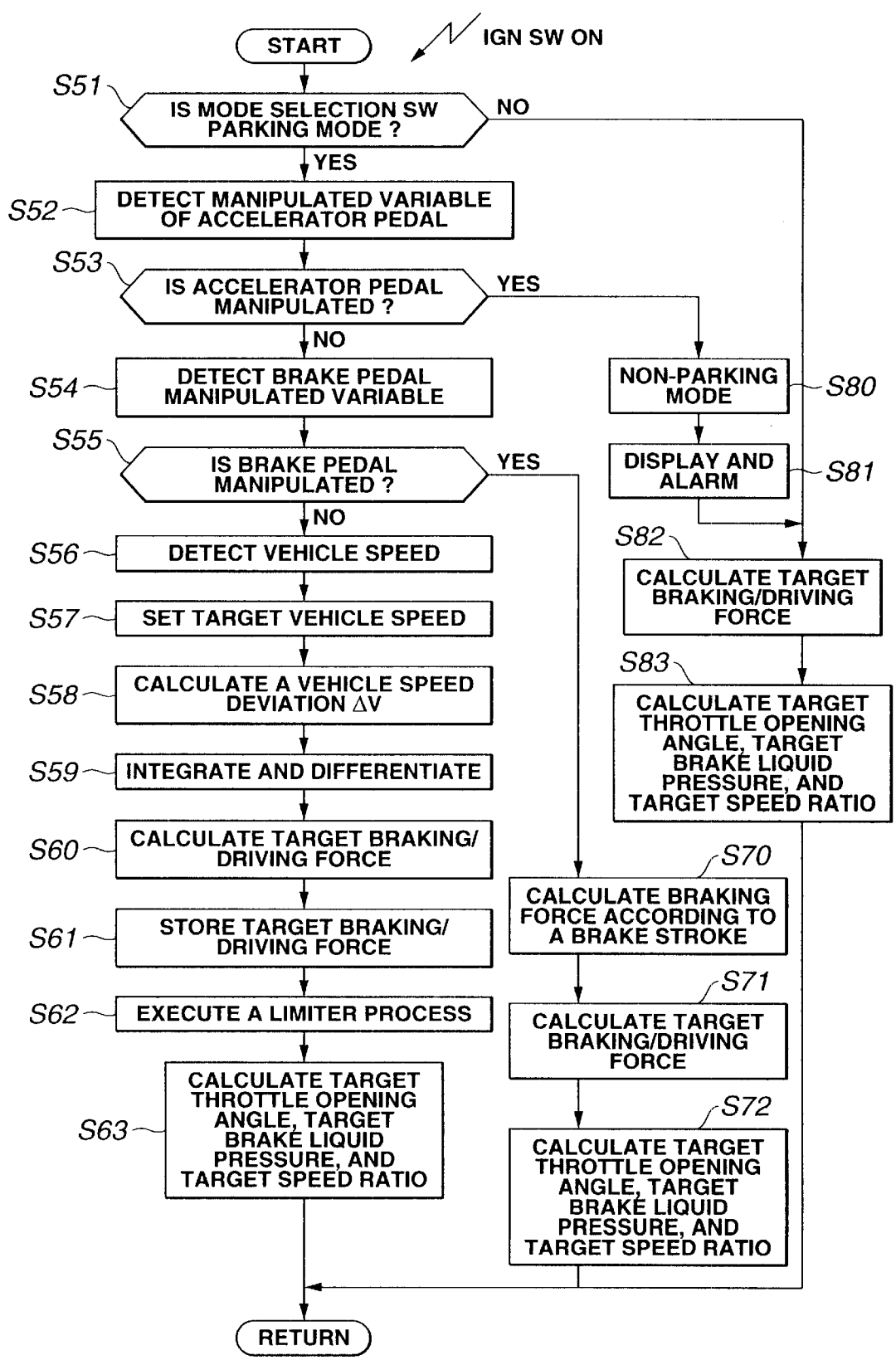
FIG. 4 is an operational flowchart executed by the controller of a second preferred embodiment according to the present invention.

In the case where the routine shown in FIG. 4 goes to step S57, controller 50 determines a state in which brake pedal 30A is not operated. Since brake pedal 30A is not operated, controller 50 reads the target vehicle speed (for example, 10 Km/h) which indicates the brake manipulated variable of zero [%] from the map previously stored in ROM 50b of controller 50 and shown in FIG. 3 and sets the read target vehicle speed as the target vehicle speed.

At the next step S58, controller 50 calculates the vehicle speed deviation $\Delta V$ between the present (actual) vehicle speed detected at step S56 and a target vehicle speed set at step S57.

At the step S59, controller 50 calculates an integration ($\int \Delta V$) of the vehicle speed deviation $\Delta V$ calculated at step S58 and a differentiation $((d/dt) \cdot \Delta V)$ of the vehicle speed deviation ($\Delta V$). At the next step S60, controller 50 calculates the target braking/driving force on the basis of the following equation:

Target Braking/Driving Force Te=$K_p \cdot \Delta V + K_I \int \Delta V + K_D ((d/dt) \cdot \Delta V)$ This is because the manipulated variable of brake pedal 30A is 0[%], the target vehicle speed is 10 Km/h, the vehicle speed presently detected is, for example, 7 Km/h, the deviation of the vehicle speed (namely, 10−7=3 Km/h) to achieve the braking/driving force may be obtained. Steps S59 through S60 calculate such target braking/driving forces as described above. At the step S61, controller 50 stores the target braking/driving force calculated at step S60. At the next step S62, controller 50 compares target braking/driving force Te stored at step S61 with a predetermined braking/driving force T. If Te>T, the limiter is provided for target braking/driving force calculated at step S60. At the next step S62, controller 50 compares target braking/driving force Te stored at step S61 with a predetermined braking/driving force T. If Te>T, the limiter is provided for target braking/driving force.

It is noted that, in this embodiment, the upper limit value is provided for the braking/driving force but the upper limit value may be provided for the driving force and may not be provided for the braking force. In order to simplify the calculation, the upper limit value is provided for the combination of the braking force with the driving force. At the next step S63, controller 50 calculates the target throttle opening angle of the engine to achieve the limiter provided target braking/driving force at step S62. The target liquid pressure of the brake to achieve target braking/driving force is calculated and outputted to brake controller 70. The target transmission gear ratio (target speed ratio) to achieve the target braking/driving force is outputted to transmission controller 80 and the routine is returned to step S51. It is noted that, at step S63, each of engine controller 60, brake controller 70, and transmission controller 80 performs the control to achieve respectively inputted target throttle opening angle, target liquid pressure, and target speed ratio.

In a case where neither accelerator pedal 20A nor brake pedal 30A is manipulated, the target driving force is calculated to maintain the vehicle speed constant and a newest value of the calculated target driving force is always stored.

On the other hand, if controller 50 determines that brake pedal 30A is manipulated, controller 50 calculates the braking force corresponding to the manipulated variable of brake pedal 30A at step S70.

At step S71, controller 50 adds the target braking/driving force stored at step S61 to the braking force calculated at step S70 to calculate a new target braking/driving force.

At the next step S72, controller 50 calculates the throttle opening angle, the brake liquid pressure, and the speed ratio on the basis of the new target braking/driving force calculated at a step S72. Each target value described above is outputted to the corresponding one of controllers 60, 70, and 80.

If controller 50 determines that accelerator pedal 20A is manipulated at step S53 (Yes), controller 50 force fully moves mode selection switch 10 to the non-parking mode. At the next step S81, controller 50 displays that display 90 is entered in the non-parking mode and produces the alarm through buzzer 95.

If the non-parking mode is selected through mode selection switch 10 at step S51 (No) and if the manipulation of accelerator pedal 20A is detected at step S53 (Yes), controller 50 calculates target braking/driving force at a step S82.

At the next step S83, controller 50 calculates target throttle opening angle of engine 65, calculates target liquid pressure of brake 75, and calculates target speed ratio of CVT 85. Each target value described above is outputted to the corresponding one of controllers 60, 70, and 80.

As described hereinabove, during a non-operation of brake pedal 30A in the second embodiment, the vehicle speed is controlled at the predetermined constant vehicle speed. If brake pedal 30A is operated, the controller 50 controls the braking/driving force in accordance with the manipulated variable of brake pedal 30A by the vehicle driver from a time point at which the driver manipulates brake pedal 30A.

It becomes possible for the vehicle to run at a constant vehicle speed irrespective of a situation of a road during the non-operation of brake pedal 30A. After brake pedal 30A is manipulated, the driving/braking force can be controlled by carrying out the brake manipulated from the predetermined constant vehicle speed irrespective of the road situation after the brake pedal is manipulated. It is noted that, in the specification, the driving force means a power generated in a positive direction with respect to a forwarding direction of the vehicle, the braking force means the power generated in a reverse direction to the forwarding direction of the vehicle, and the braking/driving force means a power of an addition of both of the driving force and the braking force.

Hence, in a case where the parking is carried out while the vehicle is ascending the slope, the power generated by engine 65 and developed in the direction in which the vehicle is ascending the slope is the driving force, the power developed in such a way that the vehicle does not ascend the ascending slope through the brake or engine brake is the braking force. The power combined with the driving force and the braking force is the braking/driving force. On the contrary, in a case where as described in the first embodiment, the parking is carried out while the vehicle is descending the slope, the power developed due to the engine brake to descend the slope according to the brake pedal manipulation is the driving force. The power acted in a direction such that the brake or engine brake is acted in a direction not to descend the slope is the braking force. The power which is the combination of the driving force and the braking force in the braking/driving force. In addition, the driving force is not only developed by the engine or transmission but also includes a power acted in an acceleration direction due to a weak brake liquid pressure by a relief of the brake manipulated variable. Similarly, the braking force is not developed only by means of the brake but also includes the power acted in the deceleration direction by means of the engine brake due to the weakening of the accelerator manipulated variable.

The entire contents of a Japanese Patent Application No. 2001-076248 (filed in Japan on Mar. 16, 2001) are herein incorporated by reference. The scope of the invention is defined with reference to the following claims.

What is claimed is:

1. A braking/driving force controlling apparatus for an automotive vehicle, comprising:
    a state discriminating section that discriminates between a parking state in which a manipulation for the vehicle to be parked is carried out and a non-parking state in which no manipulation for the vehicle to be parked is carried out;
    a manual input section that is enabled to be manipulated;
    a manipulated variable detecting section that detects a manipulated variable of the manual input section;
    a target vehicle speed generating section that generates a constant target vehicle speed corresponding to the manipulated variable detected by the manipulated variable detecting section in a case where the state discriminating section discriminates the parking state;
    a braking/driving force calculating section that calculates a vehicular braking/driving force for a present vehicle speed to become the target vehicle speed; and
    a braking/driving force controlling section that controls the vehicular braking/driving force on the basis of the vehicular braking/driving force calculated by the braking/driving force calculating section.

2. A braking/driving force controlling apparatus for an automotive vehicle as claimed in claim 1, wherein the manual input section is a brake pedal and the manipulated variable detecting section detects the manipulated variable of the brake pedal.

3. A braking/driving force controlling apparatus for an automotive vehicle as claimed in claim 2, wherein the target vehicle speed generating section generates a constant vehicle speed as the target vehicle speed when the manipulated variable of the brake pedal detected by the manipulated variable detecting section is zero and generates the target vehicle speed which becomes smaller as the manipulated variable of the brake pedal becomes larger from zero.

4. A braking/driving force controlling apparatus for an automotive vehicle as claimed in claim 1, wherein the manual input section is an accelerator pedal and the manipulated variable detecting section detects the manipulated variable of the accelerator pedal.

5. A braking/driving force controlling apparatus for an automotive vehicle as claimed in claim 4, wherein the target vehicle speed generating section generates a constant vehicle speed as the target vehicle speed when the manipulated variable of the accelerator pedal detected by the manipulated variable detecting section is zero and generates the target vehicle speed which becomes smaller as the manipulated variable of the accelerator pedal becomes larger from zero.

6. A braking/driving force controlling apparatus for an automotive vehicle as claimed in claim 1, wherein the manual input section is a lever and the manipulated variable detecting section detects the manipulated variable of the lever.

7. A braking/driving force controlling apparatus for an automotive vehicle as claimed in claim 6, wherein the target vehicle speed generating section generates a constant vehicle speed as the target vehicle speed when the manipulated variable of the lever detected by the manipulated variable detecting section is zero and generates the target vehicle speed which becomes smaller as the manipulated variable of the lever becomes larger from zero.

8. A braking/driving force controlling apparatus for an automotive vehicle as claimed in claim 6, wherein the target vehicle speed generating section generates a constant vehicle speed as the target vehicle speed when the manipulated variable of the lever detected by the manipulated variable detecting section is zero and generates the target vehicle speed which becomes larger as the manipulated variable of the lever becomes larger from zero.

9. A braking/driving force controlling apparatus for an automotive vehicle as claimed in claim 5, wherein the constant vehicle speed is 0 km/h.

10. A braking/driving force controlling apparatus for an automotive vehicle as claimed in claim 1, wherein the target vehicle speed generating section generates the constant target vehicle speed when the manipulated variable detected by the manipulated variable detecting section is zero and wherein the braking/driving force calculating section calculates a new target braking/driving force which is a combination of the braking/driving force to provide the constant target vehicle speed with the braking/driving force based on the manipulated variable detected by the manipulated variable detecting section when the manipulated variable detected by the manipulated variable detecting section becomes a value other than zero.

11. A braking/driving force controlling apparatus for an automotive vehicle as claimed in claim 1, wherein the braking/driving force controlling section controls at least one of a braking force of the vehicle and a driving force of the vehicle on the basis of the braking/driving force calculated by the braking/driving force calculating section and an upper limit value of the braking/driving force calculated by the braking/driving force calculating section is provided for the driving force of a forward direction of the vehicle.

12. A braking/driving force controlling apparatus for an automotive vehicle as claimed in claim 3, wherein the braking/driving force calculating section calculates a deviation of the vehicle speed between the present vehicle speed detected by the vehicle speed detecting section and the target vehicle speed generated by the target vehicle speed generating section and calculates the vehicular braking/driving force from the deviation of the vehicle speed.

13. A braking/driving force controlling apparatus for an automotive vehicle as claimed in claim 12, wherein the braking/driving force calculating section calculates the vehicular braking/driving force Te as follows: Te=$K_P \cdot \Delta V +$ $K_I \cdot \int \Delta V + K_D \cdot ((d/dt) \cdot \Delta V))$, wherein $\Delta V$ denotes the deviation of the vehicle speed, $K_P$ denotes a predetermined proportional gain, $K_I$ denotes a predetermined integration gain, and $K_D$ denotes a predetermined differential gain.

14. A braking/driving force controlling apparatus for an automotive vehicle as claimed in claim 13, further comprising a limiter providing section which provides an upper limit value for the calculated vehicular braking/driving force Te.

15. A braking/driving force controlling apparatus for an automotive vehicle as claimed in claim 14, wherein a maximum value of the target vehicle speed is preset to a vehicle speed value equal to or higher than an ordinary vehicle creep speed that can be obtained at a run of the vehicle on a flat road.

16. A braking/driving force controlling apparatus for an automotive vehicle as claimed in claim 15, wherein the maximum value of the target vehicle speed is 10 Km/h.

17. A braking/driving force controlling apparatus for an automotive vehicle, comprising:
- a state discriminating section that discriminates between a parking state in which a manipulation for the vehicle to be parked is carried out and a non-parking state in which no manipulation for the vehicle to be parked is carried out;
- a manual input section that is enabled to be manipulated;
- a manipulated variable detecting section that detects a manipulated variable of the manual input section;
- a target vehicle speed generating section that generates a target vehicle speed based on the manipulated variable detected by the manipulated variable detecting section;
- a braking/driving force calculating section that calculates a vehicular braking/driving force for a present vehicle speed to become the target vehicle speed generated by the target vehicle speed generating section; and
- a braking/driving force controlling section that controls a vehicular braking/driving force on the basis of the vehicular braking/driving force calculated by the braking/driving force calculating section, and wherein the target vehicle speed generating section generates a constant target vehicle speed when the manipulated variable detected by the manipulated variable detecting section is zero and the braking/driving force calculating section calculates a new target braking/driving force by combining the vehicular braking/driving force for the vehicle speed to become the constant target vehicle speed with the vehicular braking/driving force based on the manipulated variable detected by the manipulation detecting section.

18. A braking/driving force controlling apparatus for an automotive vehicle as claimed in claim 17, wherein the braking/driving force controlling section controls at least one of a braking force of the vehicle and a driving force of the vehicle on the basis of the braking/driving force calculated by the braking/driving force calculating section and an upper limit value of the braking/driving force calculated by the braking/driving force calculating section is provided for the driving force of a forward direction of the vehicle.

19. A braking/driving force controlling apparatus for an automotive vehicle, comprising:
- state discriminating means for discriminating between a parking state in which a manipulation for the vehicle to be parked is carried out and a non-parking state in which no manipulation for the vehicle to be parked is carried out;
- manual input means enabled to be manipulated;
- manipulated variable detecting means for detecting a manipulated variable of the manual input means;
- target vehicle speed generating means for generating a constant target vehicle speed corresponding to the manipulated variable detected by the manipulated variable detecting means in a case where the state discriminating means discriminates the parking state;
- braking/driving force calculating means for calculating a vehicular braking/driving force for a present vehicle speed to become the target vehicle speed; and
- braking/driving force controlling means for controlling the vehicular braking/driving force on the basis of the vehicular braking/driving force calculated by the braking/driving force calculating means.

20. A braking/driving force controlling method for an automotive vehicle, comprising:
- discriminating between a parking state in which a manipulation for the vehicle to be parked is carried out and a non-parking state in which no manipulation for the vehicle to be parked is carried out;
- detecting a manipulated variable of a manual input section that is enabled to be manipulated;
- generating a constant target vehicle speed corresponding to the detected manipulated variable in a case where the parking state is discriminated;
- calculating a vehicular braking/driving force for a present vehicle speed to become the target vehicle speed; and
- controlling the vehicular braking/driving force on the basis of the calculated vehicular braking/driving force.

* * * * *